US012631063B1

(12) United States Patent
Youngblood

(10) Patent No.: US 12,631,063 B1
(45) Date of Patent: May 19, 2026

(54) RAIL SLIDER ASSEMBLY FOR CURTAIN OF HANGAR FOR AIR VEHICLES

(71) Applicant: Drone Defense Professionals, Woodbridge, VA (US)

(72) Inventor: Brandon Youngblood, Woodbridge, VA (US)

(73) Assignee: Drone Defense Professionals, Woodbridge, VA (US)

( * ) Notice: Subject to any disclaimer, the term of this patent is extended or adjusted under 35 U.S.C. 154(b) by 23 days.

(21) Appl. No.: 18/955,441

(22) Filed: Nov. 21, 2024

(51) Int. Cl.
*E05D 15/06* (2006.01)

(52) U.S. Cl.
CPC .... *E05D 15/0652* (2013.01); *E05Y 2201/684* (2013.01); *E05Y 2900/108* (2013.01); *E05Y 2900/144* (2013.01)

(58) Field of Classification Search
CPC ............ E05D 15/0652; E05D 15/0626; E05D 15/063; E05D 15/0643; E05D 15/0647; E05D 15/0678; E05Y 2900/108; A47H 13/01; A47H 15/00; A47H 15/02; A47H 15/04
See application file for complete search history.

(56) References Cited

U.S. PATENT DOCUMENTS 254,889 A * 3/1882 Van Liew ........... E05D 15/0643 49/412
699,971 A * 5/1902 Poschmann ............ A47H 15/04 211/124
712,163 A * 10/1902 White .................... A47H 15/02 16/88
863,595 A * 8/1907 Dipple, Jr. .......... E05D 15/0643 16/88
913,150 A * 2/1909 McQueen ............. E05D 15/063 16/107
934,974 A * 9/1909 Kanaly ............... E05D 15/0643 16/88
(Continued)

FOREIGN PATENT DOCUMENTS

| | | |
|---|---|---|
| CN | 206201920 U | 5/2017 |
| CN | 209942354 U | 1/2020 |
| CN | 218623638 U | 3/2023 |

OTHER PUBLICATIONS

"Aircraft Hangar Curtains", Akon Curtains, Retrieved from internet URL: https://www.curtain-and-divider.com/aircraft-hangar-curtains/ on Nov. 18, 2024, 13 pages.

*Primary Examiner* — Jeffrey O'Brien

(57) ABSTRACT

A rail slider assembly to includes a rail adapted to be attached to a roof of the hangar and including a strut having a pair of lips arranged aligned to each other and defining an opening therebetween. At least one curtain is arranged to extend through the opening. A plurality of sliders is movably arranged inside the strut to support the at least one curtain and move the at least one curtain into an expanded configuration and a folded configuration. Each of the plurality of sliders comprises a frame arranged inside the strut, and a plurality of balls attached to the strut and supported on the lips. The plurality of balls is arranged to slide on the lips to facilitate the movement of the slider inside the strut. The at least one curtain is arranged at an entrance of a hangar.

7 Claims, 6 Drawing Sheets

(56) References Cited

U.S. PATENT DOCUMENTS

| | | | | | |
|---|---|---|---|---|---|
| 1,020,776 | A * | 3/1912 | Parry et al. | E05D 15/0643 | 16/88 |
| 1,041,833 | A * | 10/1912 | Marx | E05D 15/063 | 16/98 |
| 1,062,862 | A * | 5/1913 | Strohmann | E05D 15/0643 | 16/88 |
| 1,075,089 | A * | 10/1913 | Chamberlin et al. | E05D 15/0643 | 16/105 |
| 1,222,876 | A * | 4/1917 | Lewson | E05D 15/063 | 16/102 |
| 1,552,831 | A * | 9/1925 | Edsall | A47H 15/02 | 16/93 D |
| 1,569,324 | A * | 1/1926 | Horton | A47H 15/02 | 16/88 |
| 1,650,496 | A * | 11/1927 | Day | A47H 15/02 | 16/104 |
| 2,350,689 | A * | 6/1944 | Long | E05D 15/0652 | 16/96 R |
| 2,741,923 | A * | 4/1956 | Bradley | A47H 15/02 | 74/25 |
| 2,753,588 | A * | 7/1956 | Grosh | A47H 15/02 | 16/97 |
| 3,026,933 | A * | 3/1962 | Troha | A47H 5/032 | 160/346 |
| 3,143,758 | A * | 8/1964 | Dunham | E05D 15/0643 | 16/88 |
| 3,793,673 | A * | 2/1974 | Lawrence, Jr. | E05D 15/063 | 16/98 |
| 4,080,686 | A * | 3/1978 | Hagen | E05D 15/0643 | 16/88 |
| 4,112,539 | A * | 9/1978 | Hagen | F16C 29/005 | 16/88 |
| 5,542,149 | A * | 8/1996 | Yu | A47H 15/02 | 16/87.4 R |
| 6,286,261 | B1 * | 9/2001 | Hackstock | E05D 15/1047 | 49/213 |
| 6,808,150 | B1 * | 10/2004 | Roetenberg | B25H 3/04 | 248/339 |
| 7,698,781 | B2 * | 4/2010 | Cai | A47H 15/02 | 16/106 |
| 7,757,437 | B2 | 7/2010 | Schulte et al. | | |
| 8,336,597 | B2 * | 12/2012 | Laraway | E06B 3/94 | 160/40 |
| 8,523,443 | B2 * | 9/2013 | Traiser | F16C 29/04 | 384/54 |
| 8,567,472 | B2 * | 10/2013 | Stewart | E05F 15/635 | 160/199 |
| 10,273,080 | B2 * | 4/2019 | Looker | B65D 88/24 | |
| 11,187,020 | B2 * | 11/2021 | Andersson | E05D 15/0682 | |
| 12,133,605 | B1 * | 11/2024 | Luedeke | A47H 15/04 | |
| 2004/0000026 | A1 * | 1/2004 | Owens | A47H 15/02 | 16/97 |
| 2014/0026359 | A1 * | 1/2014 | Borgerding | A47H 15/02 | 16/88 |
| 2025/0027535 | A1 * | 1/2025 | Käll | E05D 15/0652 | |

* cited by examiner

RAIL SLIDER ASSEMBLY FOR CURTAIN OF HANGAR FOR AIR VEHICLES

TECHNICAL FIELD

The present disclosure relates, generally, to a curtain assembly for a hangar for air vehicles, and more particularly relates to rail slider assembly that enables a movement of at least one curtain along an entrance of the hangar to enable an opening and closing of the entrance of the hangar.

BACKGROUND

Temporary aircraft hangars or sunshades are generally open air hangers. Current fire codes restrict the closure of these types of aircraft hangars when certain material e.g. fuel, batteries, etc. are present inside these hangars, thereby allowing an entry of unauthorized drones inside the hangars, which is undesirable.

SUMMARY

In one aspect of the disclosure, a rail slider assembly is disclosed. The rail slider assembly facilitates a movement of at least one curtain arranged at an entrance of a hangar between an expanded configuration and a folded configuration. The rail slider assembly includes a rail adapted to be attached to a roof of the hangar and including a strut having a pair of lips arranged aligned to each other and defining an opening therebetween. The at least one curtain is arranged to extend through the opening. The rail slider assembly also includes a plurality of sliders movably arranged inside the strut to support the at least one curtain and move the at least one curtain into the expanded configuration and the folded configuration. Each of the plurality of sliders comprises a frame arranged inside the strut, and a plurality of balls attached to the strut and supported on the lips. The plurality of balls is arranged to slide on the lips to facilitate the movement of the slider inside the strut.

In some additional, alternative, or selectively cumulative embodiments, the frame includes a first member extending along a length of the strut and a pair of flanges arranged at longitudinal ends of the first member and extending perpendicularly to the first member. The plurality of balls is coupled to ends of the pair of flanges.

In some additional, alternative, or selectively cumulative embodiments, the plurality of balls is non-movably attached to the flanges.

In some additional, alternative, or selectively cumulative embodiments, the frame includes yoke structures arranged at the ends of the flanges and each of the plurality of balls is arranged between arms of associated yoke structure of the yoke structures.

In some additional, alternative, or selectively cumulative embodiments, the slider includes an engagement structure attached to the frame and configured to engage with the at least one curtain to secure the curtain with the slider.

In some additional, alternative, or selectively cumulative embodiments, the engagement structure includes a V-shaped clamp.

In another aspect of the disclosure, a curtain assembly is disclosed. The curtain assembly is for a hangar to store one or more air vehicles. The curtain assembly includes at least one curtain adapted to be arranged at an entrance of the hangar and configured to be displaced between an expanded configuration and a folded configuration. The curtain assembly also includes a rail adapted to be attached to a roof of the hangar and including a strut having a pair of lips arranged aligned to each other and defining an opening therebetween. The at least one curtain is arranged to extend through the opening. The curtain assembly further includes a plurality of sliders movably arranged inside the strut to support the at least one curtain and move the at least one curtain into an expanded configuration and a folded configuration. Each of the plurality of sliders includes a frame arranged inside the strut, and a plurality of balls attached to the strut and supported on the lips. The plurality of balls is arranged to slide on the lips to facilitate the movement of the slider inside the strut.

In some additional, alternative, or selectively cumulative embodiments, the frame includes a first member extending along a length of the strut and a pair of flanges arranged at longitudinal ends of the first member and extending perpendicularly to the first member. The plurality of balls is coupled to ends of the pair of flanges In some additional, alternative, or selectively cumulative embodiments, the plurality of balls is non-movably attached to the flanges.

In some additional, alternative, or selectively cumulative embodiments, the frame includes yoke structures arranged at the ends of the flanges and each of the plurality of balls is arranged between arms of associated yoke structure of the yoke structures.

In some additional, alternative, or selectively cumulative embodiments, the slider includes an engagement structure attached to the frame and configured to engage with the at least one curtain to secure the curtain with the slider.

In some additional, alternative, or selectively cumulative embodiments, the engagement structure includes a V-shaped clamp.

In some additional, alternative, or selectively cumulative embodiments, the at least one curtain includes at least one net curtain.

DETAILED DESCRIPTION

The present disclosure is directed to a curtain assembly for an aircraft hangar to prevent an intrusion of unauthorized drones inside the hangar, while still maintaining the needed ventilation inside the hangar when the aircrafts and/or fuel batteries are stored/arranged inside the hangar.

Figure 1:
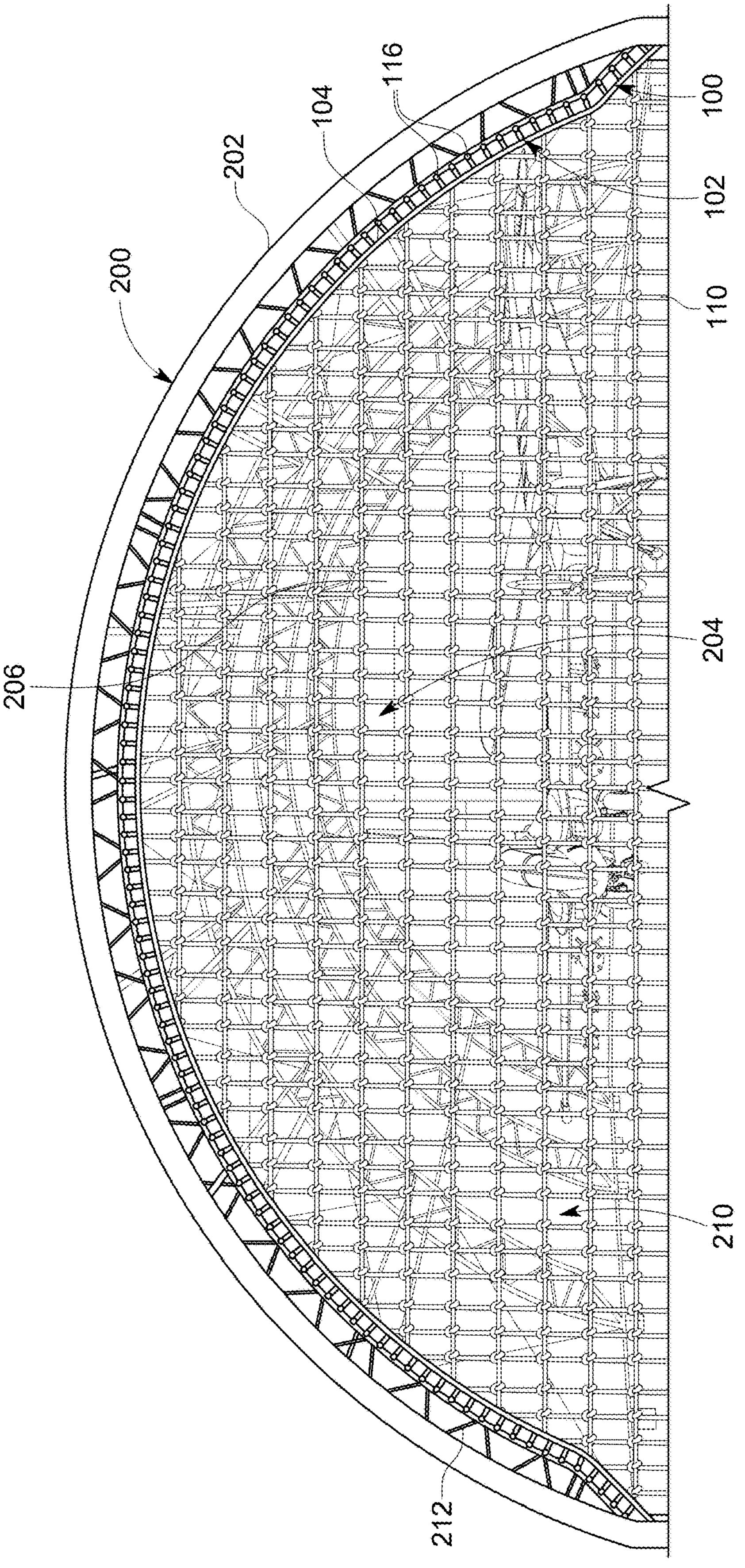
FIG. 1 shows a front perspective view of a hangar with a curtain assembly attached to the hangar and a curtain arranged covering an entrance of the hangar, in accordance with an embodiment of the present disclosure.
Figure 2:
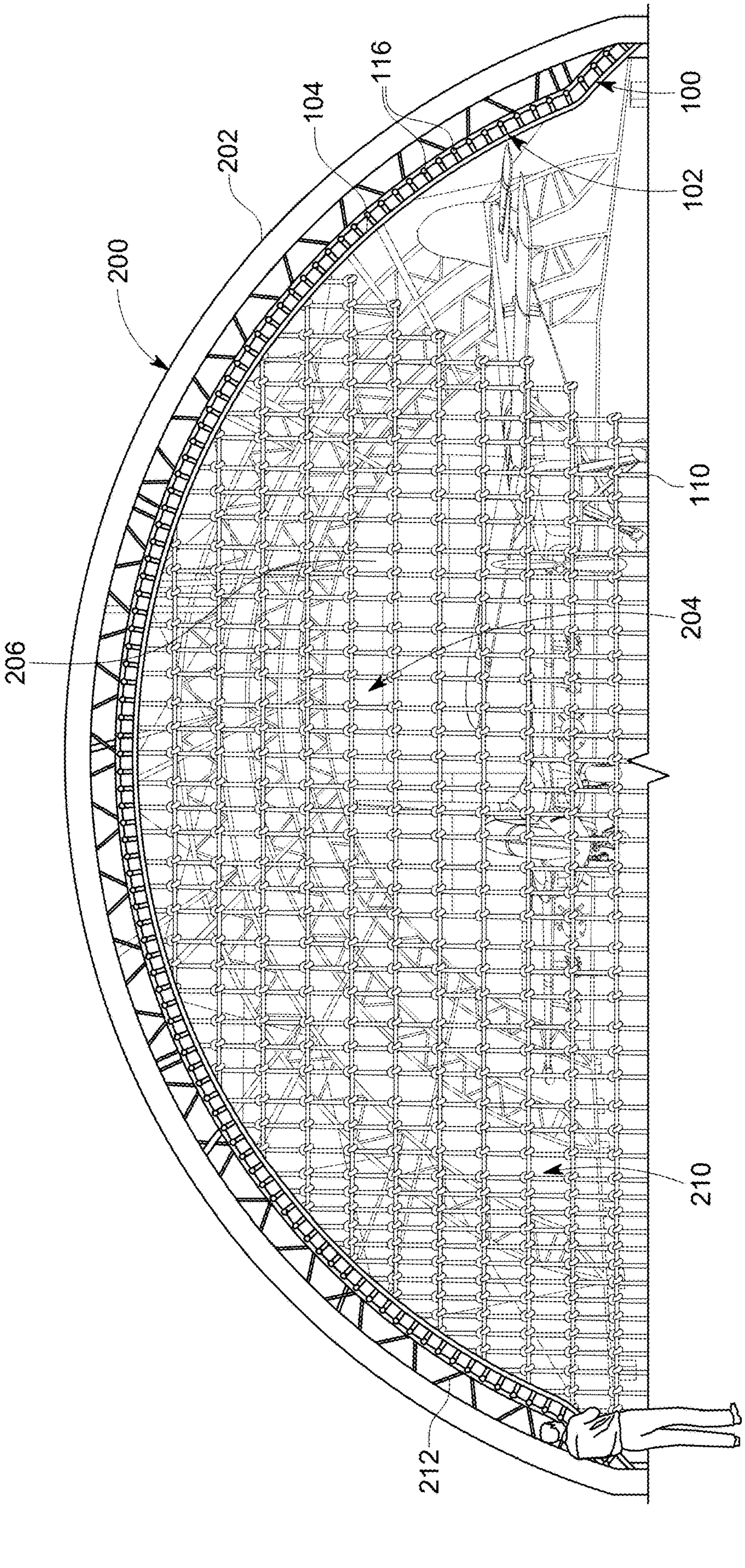
FIG. 2 shows a front perspective view of the hangar with curtain arranged partially covering the entrance of the hangar, in accordance with an embodiment of the present disclosure.

Referring to FIGS. 1 and 2, a curtain assembly 100 arranged covering an entrance of a hangar 200 is shown. As shown, the hangar 200 may be a temporary hangar/sunshade and includes a roof 202 arranged in an arcuate shape and defining a storage area 204 to store one or more air vehicles, for example, aircrafts, helicopters, etc., and a rear wall 206 arranged to cover a rear opening defined between the roof 202 and a ground surface. Further, the roof 202 defines a front/entrance opening 210 i.e., the entrance 210 arranged at front end 212 of the roof 202 i.e., hangar 200.

Figure 3:
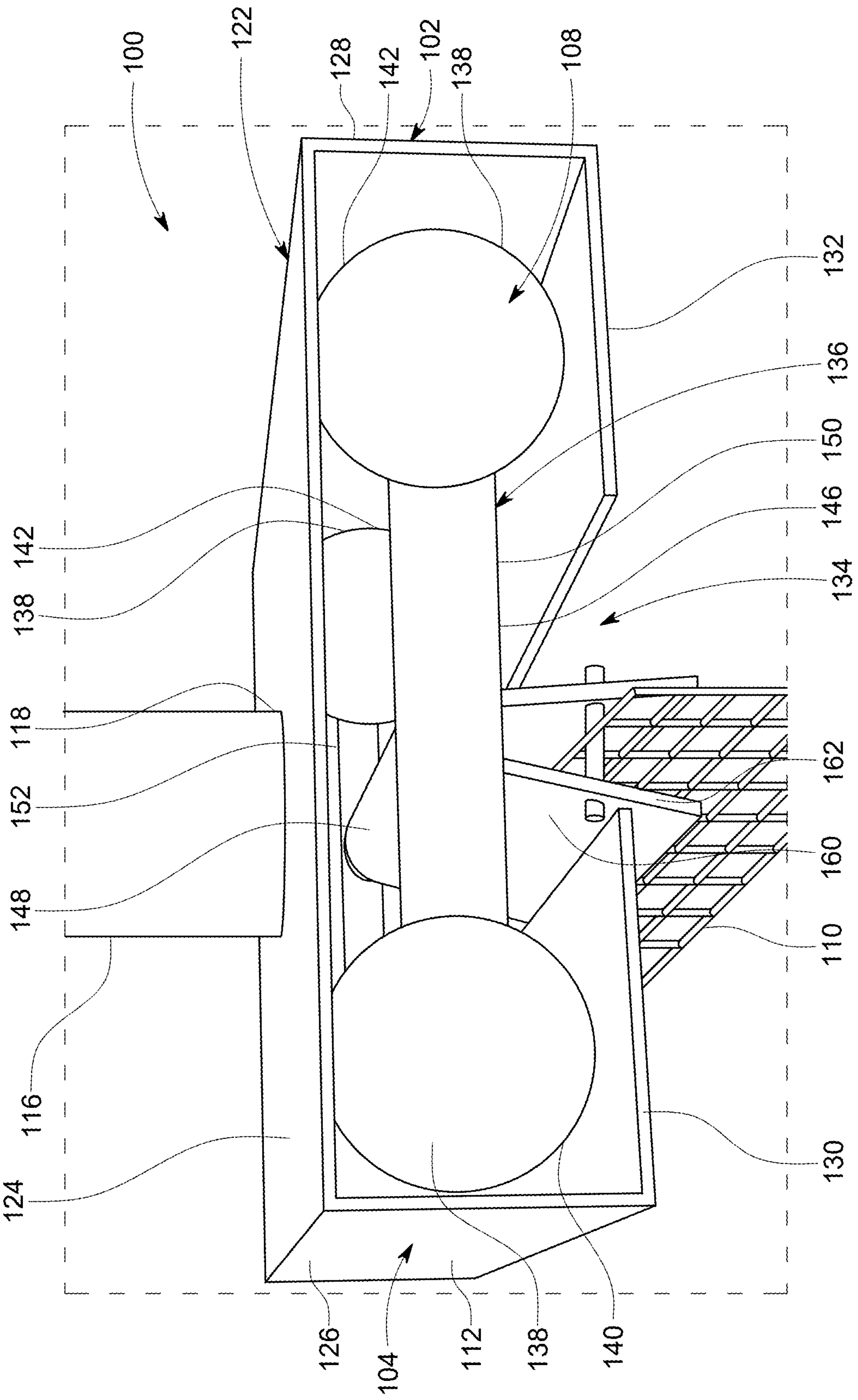
FIG. 3 shows a zoom view of a portion of the curtain assembly depicting a rail and a slider arranged inside the rail, in accordance with an embodiment of the present disclosure.

As shown in FIG. 3, the curtain assembly 100 includes a rail slider assembly 102 having a rail 104 attached to the roof 202 and extending along the front end 212 of the roof 202 and a plurality of sliders 108 movably arranged inside the rail 104, and at least one curtain 110, for example, a net curtain having a plurality of holes, attached to the plurality of sliders 108 and configured to be arranged at an expanded configuration, shown in FIG. 1, and a folded configuration. In the expanded configuration, the at least one curtain 110 is arranged covering the entrance opening 210, shown in FIG. 1, restricting/preventing access of inside of the storage area 204 through the entrance opening 210, while in the folded configuration, the at least one curtain 110 enables the access of the storage area 214 through the entrance opening 210.

Figure 4:
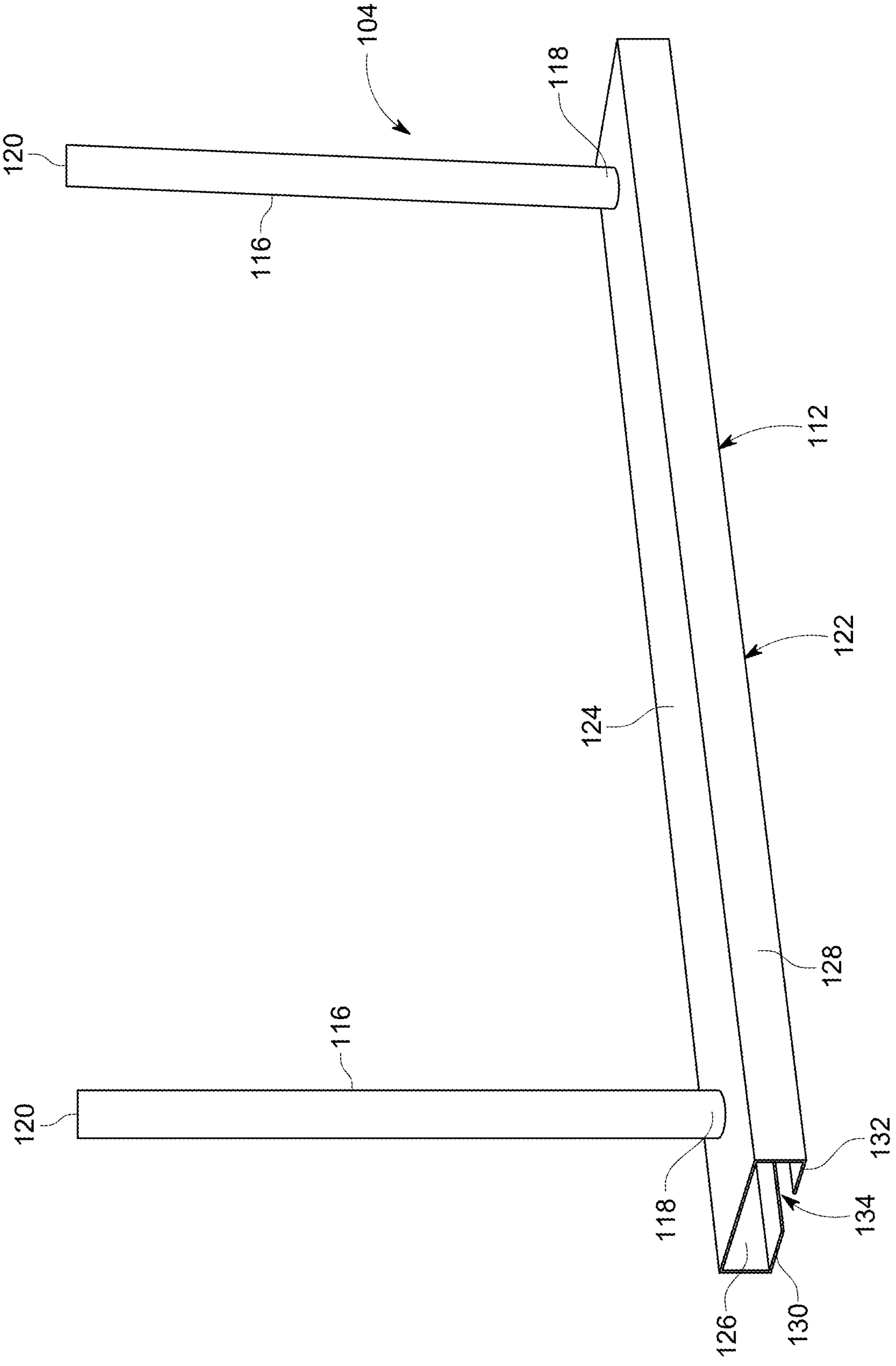
FIG. 4 shows a top perspective view of the rail depicting an interior view of a strut, in accordance with an embodiment of the present disclosure.

Referring to FIG. 3 and FIG. 4, the rail 104 includes a rail structure 112 extending along the front end 212 of the roof 202, and connected to the roof 202. In the embodiment, the rail structure 112 is attached to the roof 202 by a plurality of extension rods 116 arrayed along a length of the rail structure 112 with first ends 118 of the extension rods 116 attached to the rail structure 112 and second ends 120 of the extension rods 116 attached/secured to the roof 202. In an embodiment, the hooks/clamps may be attached to the second ends 120 of the extension rods 116, and the hooks/clamps are engaged with the roof 202 to secure the rail 104 to the roof 202.

The clamps/hooks may be structured and attached to the roof 202 so as to allow movement of the rail structure 112 in a horizontal direction perpendicular to a direction of the extension of the rail 104 along the roof 202. Such movement of the rail structure 112 facilitates the rail 104 to absorb the impact force due to small air vehicles, for example, drones, hitting on the curtain 110 when the curtain 110 is arranged at the expanded configuration.

As shown in FIGS. 3 and 4, the rail structure 112 is an elongated strut 122 having a first wall 124 and a pair of sidewalls, a first sidewall 126 and a second sidewall 128, extending vertically from the first wall 124 and arranged spaced apart from each other. The sidewalls 126, 128 extend along the longitudinally extending edges of the first wall 124. Further, the strut 122 includes a pair of lips, for example, a first lip 130 and a second lip 132 arranged spaced apart from the first wall 124 and facing the first wall 124. The first lip 130 extends towards the second sidewall 128 from a free end of the first sidewall 126, while the second lip 132 extends towards the first sidewall 126 from a free end of the second sidewall 128. The first lip 130 and the second lip 132 are arranged aligned with each other such that an opening 134 is defined between the first lip 130 and the second lip 132. The opening 134 extends along an entire length of the rail structure 112. The lips 130, 132 act as a support structure for the sliders 108, and the sliders 108 slides inside the strut 122 on the lips 130, 132.

Figure 5:
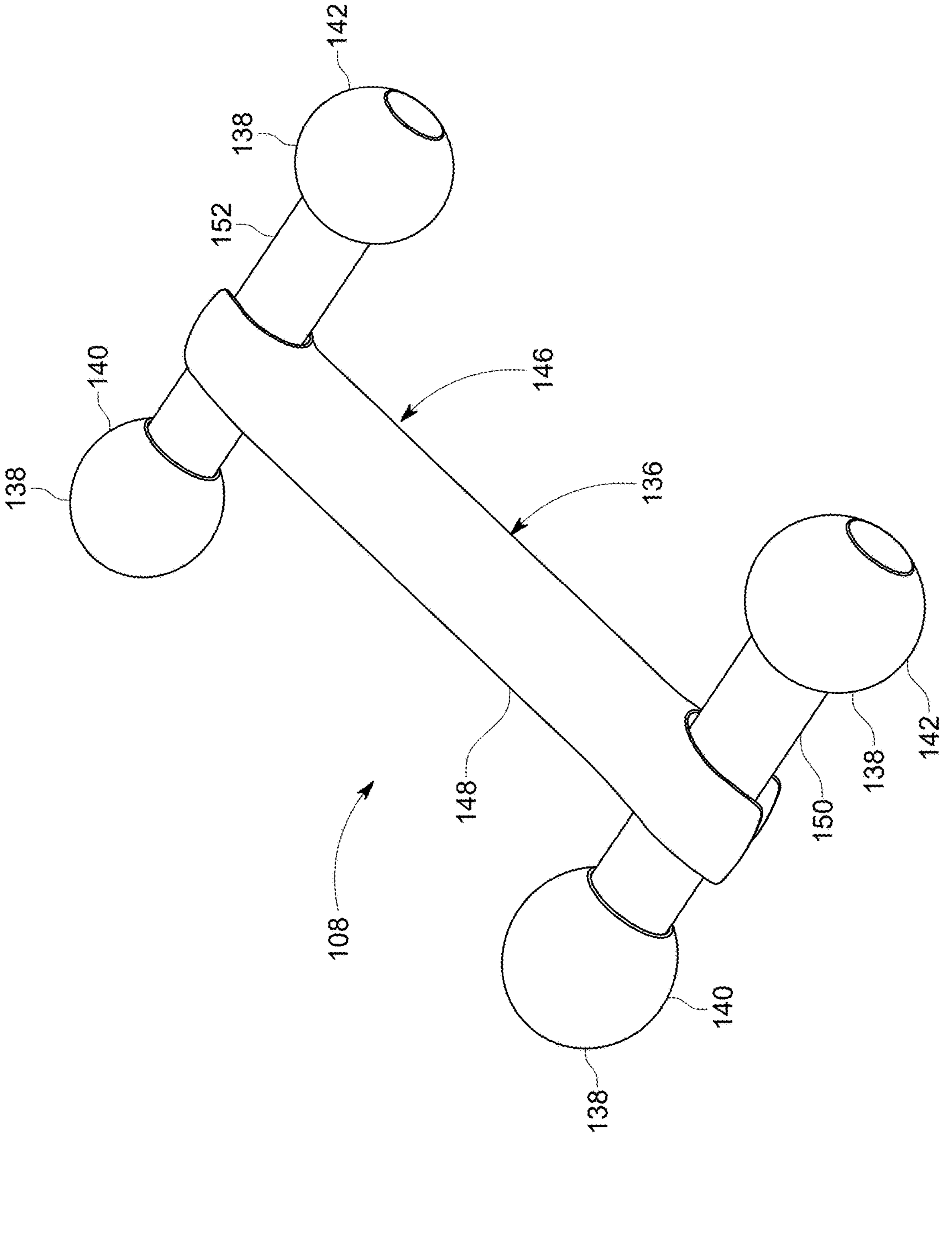
FIG. 5 shows a top perspective view of the slider with an engagement structure for connecting the curtain removed, in accordance with an embodiment of the present disclosure.

As shown in FIG. 3 and FIG. 5, the slider 108 includes a frame 136 and a plurality of spherical balls 138 connected to the frame 136 and adapted to contact the lips 130, 132 and slides on the lips 130, 132. It may be noted that the plurality of balls 138 includes at least one first ball 140 arranged slidably supported on the first lip 130, and at least one second ball 142 arranged slidably supported on the second lip 132. In the illustrated embodiment, the frame 136 includes a horizontally oriented I shaped beam 146 having a first longitudinally extending member 148 and two laterally extending flanges 150, 152 arranged at two longitudinal ends of the first member 148. Further, two first balls 140 are arranged at first ends of the two flanges 150, 152, while two second balls 142 are arranged at second ends of the two flanges 150, 152. The balls 138 are attached to the two flanges 150, 152.

In the embodiment, the balls 138 are non-movably attached to the flanges 150, 152. In such a case, the balls 138 slides on the surfaces of the lips 130, 132, enabling the movement of the slider along the length of the rail structure 112. However, the balls 138 may be movably attached to the flanges 150, 152 to enable a rolling of the balls 138 on the lips 130, 132. It may be noted that the due to spherical shape of the balls 138, contact area between the ball 138 and the associated lip 130, 132 is minimized, providing an easy of sliding of balls 138 on the lips 130, 132. Accordingly, the curtain 110 can be moved easily, with reduced force, between the expanded configuration and the folded configuration. In some embodiments, the sliders 108 may be operatively coupled to an electric actuator including an electric motor to move the sliders 108 inside the rail structure 112 for moving the curtain 110 between the expanded configuration and the folded configuration.

Additionally, the slider 108 includes an engagement structure 160, for example, a V-shaped clamp 162 attached to the first member 148 and extending vertically downwardly from the first member 148. Dimensions of the engagement structure 160 are selected such that that at least a portion of the engagement structure 160 extends outwardly of the rail structure 112 through the opening 134 defined between the two lips 130, 132 of the rail structure 112. The engagement structure 160 is configured to engage with the curtain 110 and secure and retain the curtain 110 with the slider 108. In the embodiment, the curtain 110 is attached to the V-shaped clamp 162 by inserting a portion of the curtain 110 inside the V-shaped clamp 162 and then securing the curtain 110 with the clamp 162 via suitable fasteners.

Figure 6:
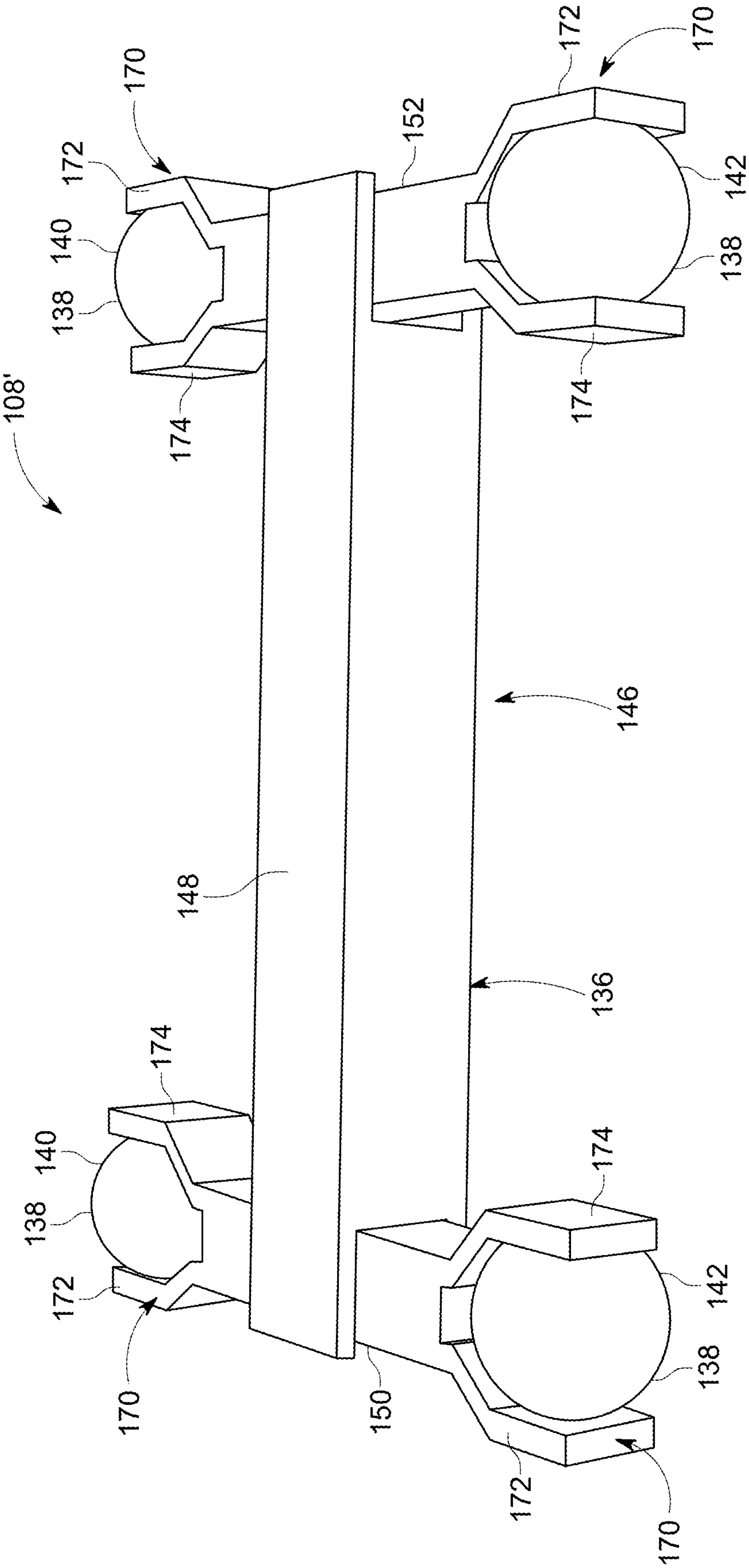
FIG. 6 shows a top perspective view of a slider with an engagement structure for connecting the curtain removed, in accordance with an embodiment of the present disclosure.

Referring to FIG. 6, an alternative slider 108' is shown. The slider 108' is similar to the slider 108 except that a frame 136' of the slider 108' includes yoke structures 170 defined at the ends of the flanges 150, 152, and the balls 138 are arranged inside the respective yoke structure 170 and are attached to the arms 172, 174 of the associated yoke structure 170.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

Many modifications and other implementations of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims.

What is claimed is:

1. A rail slider assembly for moving at least one curtain between an expanded configuration and a folded configuration at an entrance of a hangar for one or more air vehicles, the rail slider assembly comprising:

a rail adapted to be attached to a roof of the hangar and including a strut having a pair of lips arranged aligned to each other and defining an opening therebetween, wherein the at least one curtain extends through the opening; and a plurality of sliders movably arranged inside the strut to support the at least one curtain and move the at least one curtain into the expanded configuration and the folded configuration, each of the plurality of sliders comprises:

a frame arranged inside the strut, and a plurality of balls attached to the frame and supported on the lips, wherein the plurality of balls is arranged to slide on the lips to facilitate the movement of the slider inside the strut;

wherein the frame includes a first member extending along a length of the strut and a pair of flanges arranged at longitudinal ends of the first member and extending perpendicularly to the first member, wherein the plurality of balls is coupled to ends of the pair of flanges;

wherein each slider includes a V-shaped clamp comprising:

a bent portion bent around the first member of the corresponding frame, and a pair of legs extending through the rail opening and configured to engage with the at least one curtain to secure the curtain with the slider.

2. The rail slider assembly of claim 1, wherein the plurality of balls is non-movably attached to the flanges.

3. The rail sider assembly of claim 1, wherein the frame includes yoke structures arranged at the ends of the flanges and each of the plurality of balls is arranged between arms of the corresponding yoke structures.

4. A curtain assembly for a hangar to store one or more air vehicles, the curtain assembly comprising:

at least one curtain adapted to be arranged at an entrance of the hangar and configured to be displaced between an expanded configuration and a folded configuration;

a rail adapted to be attached to a roof of the hangar and including a strut having a pair of lips arranged aligned to each other and defining an opening therebetween, wherein the at least one curtain extends through the opening; and a plurality of sliders movably arranged inside the strut to support the at least one curtain and move the at least one curtain into the expanded configuration and the folded configuration, each of the plurality of sliders comprises;

a frame arranged inside the strut, and a plurality of balls attached to the frame and supported on the lips, wherein the plurality of balls is arranged to slide on the lips to facilitate the movement of the slider inside the strut;

wherein the frame includes a first member extending along a length of the strut and a pair of flanges arranged at longitudinal ends of the first member and extending perpendicularly to the first member, wherein the plurality of balls is coupled to ends of the pair of flanges:

wherein each slider includes a V-shaped clamp comprising:

a bent portion bent around the first member of the corresponding frame, and a pair of legs extending through the rail opening and configured to engage with the at least one curtain to secure the curtain with the slider.

5. The curtain assembly of claim 4, wherein the plurality of balls is non-movably attached to the flanges.

6. The curtain assembly of claim 4, wherein the frame includes yoke structures arranged at the ends of the flanges and each of the plurality of balls is arranged between arms of the corresponding yoke structures.

7. The curtain assembly of claim 4, wherein the at least one curtain includes at least one net curtain.

* * * * *